(12) United States Patent
Kato et al.

(10) Patent No.: US 6,643,984 B2
(45) Date of Patent: Nov. 11, 2003

(54) FRAME-ATTACHED WINDOW PANEL

(75) Inventors: Kenji Kato, Aichi (JP); Yoshinobu Yamamoto, Aichi (JP); Takanobu Kondo, Aichi (JP); Nobuyuki Tanaka, Aichi (JP)

(73) Assignees: Asahi Glass Company, Limited, Tokyo (JP); Toyota Shatai Kabushiki Kaisha, Kariya (JP)

( * ) Notice: Subject to any disclaimer, the term of this patent is extended or adjusted under 35 U.S.C. 154(b) by 40 days.

(21) Appl. No.: 09/978,677

(22) Filed: Oct. 18, 2001

(65) Prior Publication Data
US 2002/0046516 A1 Apr. 25, 2002

(30) Foreign Application Priority Data
Oct. 19, 2000 (JP) ......................................... 2000-319539

(51) Int. Cl.[7] ............................................... E06B 3/988
(52) U.S. Cl. ................... 52/204.53; 52/208; 52/204.67; 52/204.71; 52/717.01; 52/204.597; 296/93; 296/146.15; 296/201; 296/96.2

(58) Field of Search ............................. 52/208, 204.53, 52/204.597, 204.67, 204.71, 717.01; 296/93, 146.15, 201, 96.2

(56) References Cited

U.S. PATENT DOCUMENTS

| 4,953,907 | A | * | 9/1990 | Sugita ........................... 296/93 |
| 5,001,876 | A | * | 3/1991 | Harper et al. ................. 52/208 |
| 6,382,696 | B1 | * | 5/2002 | Young ........................... 296/93 |
| 6,460,300 | B2 | * | 10/2002 | Mikkaichi et al. ...... 52/204.597 |

* cited by examiner

Primary Examiner—Carl D. Friedman
Assistant Examiner—Steve Varner
(74) Attorney, Agent, or Firm—Oblon, Spivak, McClelland, Maier & Neustadt, P.C.

(57) ABSTRACT

A frame-attached window panel wherein a frame member comprises a base portion attached firmly to a peripheral portion of a window panel and a primary molding molded integrally with the base portion, and the primary molding is made of a material different from the material for the base portion. The generation of noises can be suppressed by the presence of the frame member which can be formed at low cost.

9 Claims, 4 Drawing Sheets

FRAME-ATTACHED WINDOW PANEL

The present invention relates to a frame-attached window panel wherein a frame member made of a resinous material is provided at a peripheral portion of a window panel, which is attached mainly to a window opening of automobile.

Heretofore, a glass sheet attached with a frame member (a frame-attached window panel) is attached to a window opening of an automobile.

FIG. 6 is a cross-sectional view partly omitted showing an example of the frame-attached glass sheet 110 which is attached to a window opening 96 formed in a body panel 95 of automobile. The frame-attached glass sheet 110 comprises a glass sheet 90 and a molding (a frame member) 111 made of a resinous material which is provided at a peripheral portion of the glass sheet 90.

The molding 111 is provided with a base portion 112 connected firmly to the glass sheet 90 and a lip portion 113 projecting from the base portion 112. The lip portion 113 is in contact with an opening circumferential wall 95a (i.e., a portion of the body panel 95) to define the window opening 96 so that water or dust is prevented from entering from an automobile exterior side into the automobile cabin through the window opening 96, namely, the lip portion 113 seals the window opening.

As a material for the molding 111, plasticized polyvinyl chloride or the like is generally used.

In recent years, a high degree of quietness has been required for automobiles during cruising. In a case of using the molding 111 wherein the base portion 112 and the lip portion 113 are formed integrally by molding, noises sometimes generate from a position where the lip portion 113 contacts the opening circumferential wall 95a during the cruising of the automobile if the contact angle of the lip portion 113 to the opening circumferential wall 95a or another condition is inappropriate. The problem of noises has become significant recently.

The generation of noises does not necessarily take place in a case that the entire circumference of the frame-attached window panel is surrounded by the window opening. For instance, when a frame-attached window panel is used for a small window or a front ventilating (referred to simply as FV) window formed in front of a door of an automobile, a rear side of the frame-attached window panel contacts a front side of the door of the automobile. Since the door of the automobile is movable, there is a certain allowance in the space between the rear side of the frame-attached window panel and the front side of the door of the automobile. The space is sealed by utilizing the elasticity of the lip portion. In the structure for sealing the space with a sufficient allowance by utilizing the elasticity of the lip portion, however, vibrations of the lip portion become remarkable due to the vibrations of the automobile or an air stream during the cruising of the automobile, with the result that the generation of noises becomes remarkable.

In order to reduce such noises, a frame-attached window panel 120 is proposed as shown in FIG. 7. The frame-attached window panel 120 is provided with a molding 121 which has a base portion 122 made of plasticized polyvinyl chloride or the like and a lip portion 123, as a separate body from the base portion 122, which is bonded to the base portion 122 by means of an adhesive means 124 such as a double-faced adhesive tape. The lip portion 123 is made of a material having a low skin friction resistance.

On the other hand, JP-A-7-62183 discloses a molding obtained by the co-extrusion of two or more kinds of material.

In the structure shown in FIG. 7, however, an operation for bonding the lip portion 123 to the base portion 122 by the adhesive means 124 is required. Further, the appearance and the durability were insufficient.

Further, in the structure disclosed in JP-A-7-62183, an operation for attaching the molding prepared by the co-extrusion to the window panel is required additionally.

It is an object of the present invention to provide a frame-attached window panel capable of suppressing the generation of noises without destroying the appearance and reducing the durability.

It is another object of the present invention to provide a method for preparing such frame-attached window panel by simplified steps.

In accordance with the present invention, there is provided a frame-attached window panel wherein a frame member made of resin is molded integrally with a peripheral portion of a window panel, the frame-attached window panel being characterized in that the frame member comprises a base portion attached firmly to the peripheral portion of the window panel and a primary molding molded integrally with the base portion, and the primary molding is made of a material different from the material for the base portion.

According to the frame-attached window panel having the above-mentioned construction, the frame member can be fixed to the window panel and the primary molding can be fixed to the base portion at the same time of forming by molding the base portion of the frame member. Any adhesive means is not used in order to integrate the primary molding with the base portion. Accordingly, since the primary molding is provided as a part made of a material having a low skin friction resistance, a frame-attached window panel having excellent appearance and durability and capable of suppressing the generation of noises can be obtained at low cost.

As the window panel, a transparent or translucent glass sheet or resin plate can be exemplified. A colored glass sheet or resin plate may be used when it has sufficient see-through properties. However, it is preferred to use a glass sheet because there is little possibility of breaking at the time of injection-molding a resinous material for the base portion of the frame member. As the glass sheet, a single glass sheet or a laminated glass can be exemplified. Further, as the glass sheet, tempering may be conducted or a functional coating such as heat reflecting film may be provided.

The material for the base portion of the frame member is selected in consideration of the points that flowability in injection-molding is good and the appearance and weathering properties after the molding are excellent. For this, plasticized polyvinyl chloride or an elastomer of olefin type, urethane type, epoxy type or acrylic type can be exemplified.

In the present invention, it is preferable that the primary molding comprises a joining portion formed integrally with a base portion and a lip portion projecting from the joining portion wherein the material for the lip portion is different from that for the joining portion.

As the material for the lip portion, a low frictional material having a low skin friction resistance such as chlorinated polyethylene, foamed EPDM or the like may be used. Here, the low frictional material means a material having a low skin friction resistance such as plasticized polyvinyl chloride. By using the above-mentioned structure and material, the occurrence of noises can be suppressed effectively.

In the present invention, it is preferable that the joining portion of the primary molding is made of the same material as the base portion of the frame member. Here, the meaning of "same material" includes a material slightly different in composition as far as the material exhibits good compatibility. For example, plasticized polyvinyl chloride and rigid polyvinyl chloride which are different in only percentage composition are within the meaning of "the same material". Thus, the durability of the frame member can further be improved.

Figure 1:
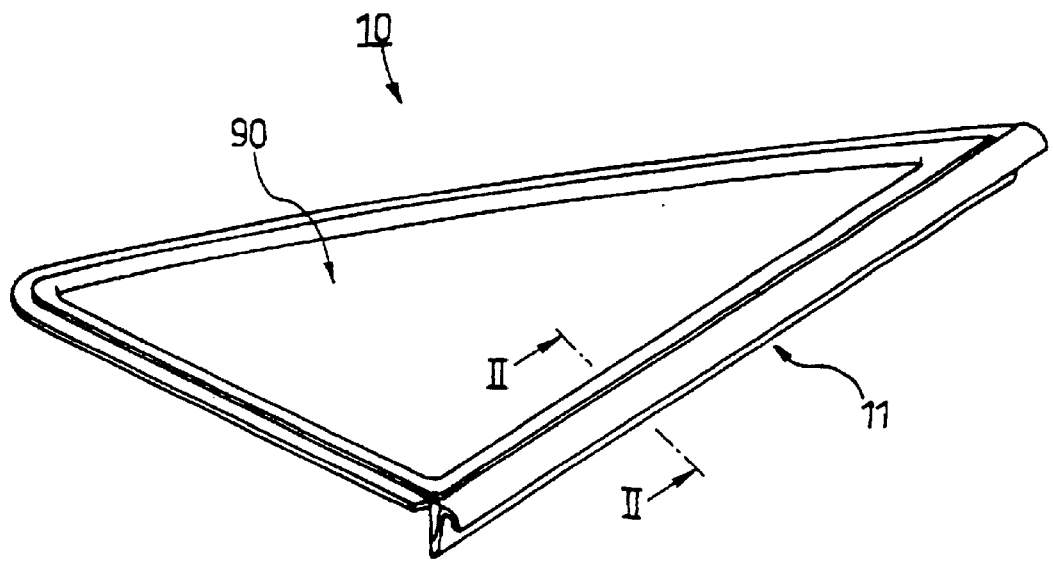
FIG. 1 is a perspective view showing a first embodiment of the frame-attached window panel according to the present invention.

Detailed description of preferred embodiments of the present invention will be described with reference to the drawings wherein the same reference numerals designate the same or corresponding parts having the same structure and function as described already, throughout the several embodiments of the present invention, and therefore, description of these parts is omitted.

Figure 2:
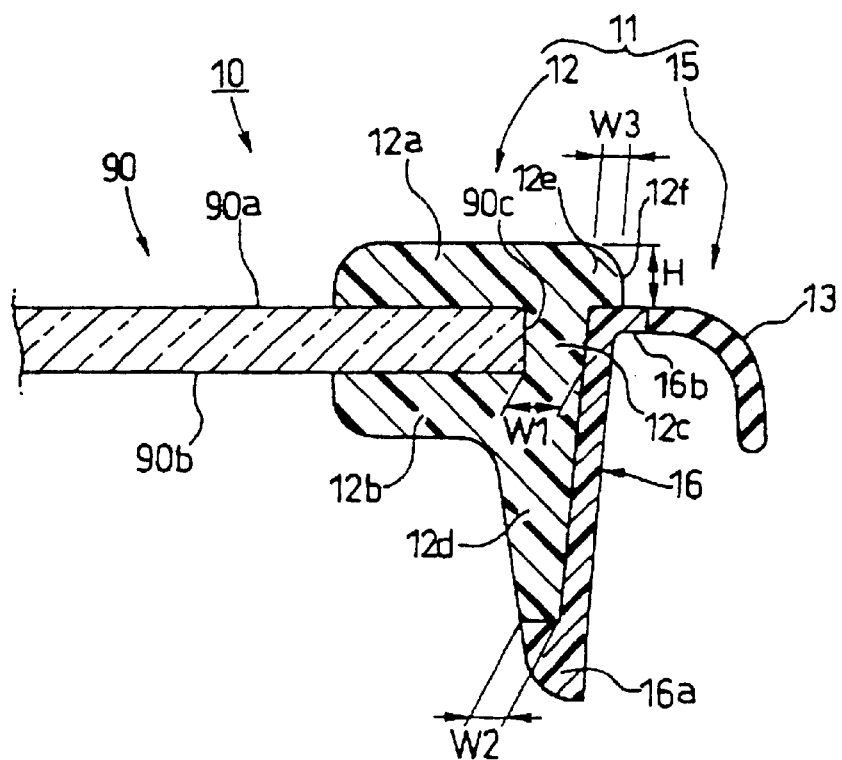
FIG. 2 is a diagrammatically cross-sectional view showing the first embodiment of the frame-attached window panel of the present invention.

FIG. 1 is a perspective view showing a first embodiment of the frame-attached window panel of the present invention, and FIG. 2 is a cross-sectional view taken along a line II—II in FIG. 1.

In FIG. 1, a frame member (molding) is provided at a peripheral portion of a glass sheet 90 as a window panel. In the first embodiment, the glass sheet 90 is a right-angled triangular shape, in plan view, having an oblique side, a long side and a short side, and the construction of the present invention is applicable to the long side.

As shown in FIG. 2, the frame member 11 is provided with a base portion 12 fixed to a peripheral portion of the glass sheet 90 and an insert 15 as a primary molding. The insert 15 is a premolded body formed previously before the base portion 12 is formed by molding.

The base portion 12 has a front surface portion 12a which presses a side of automobile exterior side 90a (a front surface) of the glass sheet 90 from an outer side of the automobile, a rear surface portion 12b which presses a side of automobile interior side (a rear surface) 90b of the glass sheet 90 from an inner side of the automobile and a connecting portion 12c which extends along an end surface 90c of the glass sheet 90 to connect the front surface portion 12a to the rear surface portion 12b. An elongated portion 12d is formed contiguous with the rear surface portion 12b so as to extend toward the inside of the automobile. Specifically, the elongated portion 12d projects from the vicinity of the connecting portion 12c of the rear surface portion 12b toward the inside of the automobile. Namely, it is extended into a direction along the end surface 90c of the glass sheet 90, i.e., in a direction of the thickness of the glass sheet 90. In this embodiment, plasticized polyvinyl chloride is used as the material for the base portion 12.

The insert 15 is provided with a joining portion 16 and a lip portion 13 wherein rigid polyvinyl chloride is used as the material for the joining portion 16 and a low frictional material (chlorinated polyethylene) is used as the material for the lip portion 13. The joining portion 16 and the lip portion 13 are formed by a two-color extrusion method. The rigid polyvinyl chloride and the chlorinated polyethylene have good compatibility, and the joining portion 16 and the lip portion 13 are strongly connected together.

The joining portion 16 is integrated with the base portion 12. The joining portion 16 is integrated with an outer side surface of the connecting portion 12c of the base portion 12 (the surface of the connecting portion 12c, which is opposite to the side in contact with the end surface 90c of the glass sheet 90, i.e., the surface at a right side in FIG. 2) and an outer side surface of the elongated portion 12d (the surface at a right side in FIG. 2), without using any adhesive means. In this embodiment, the outer side surface of the connecting portion 12c and the outer side surface of the elongated portion 12d are flush with each other, and the joining portion 16 in a flat plate-like shape is fixed to these surfaces.

The wall thickness (the dimension in a lateral direction in FIG. 2) of each of the connecting portion 12c and the elongated portion 12d of the base portion 12 is properly thickened in order to integrate certainly the insert 15 at the time of injection-molding of resin, which is described after. The wall thickness WI of the connecting portion 12c is 0.5–5 mm and the wall thickness W2 of the elongated portion 12d is 0.5–3 mm.

The joining portion 16 of the insert 15 has a thickened wall portion 16a at the end portion of automobile interior side. An inner side surface of the thickened wall portion 16a (the surface at a left side in FIG. 2) is exposed at the side of an inner side surface of the elongated portion 12d (the surface at a left side in FIG. 2). In this embodiment, the inner side surface of the thickened wall portion 16a and the inner side surface of the elongated portion 12d are flush with each other.

The joining portion 16 is further provided with an extended portion 16b at its end of automobile exterior side. The extended portion 16b is extended into a direction crossing to the extending direction of the joining portion 16 having a flat plate-like shape and projects to an outer side from the joining portion 16. The wall thickness (the dimension in a vertical direction in FIG. 2) of the extended portion 16b is made equal to the wall thickness of the lip portion 13. The lip portion 13 is contiguous with the top end of the projected extended portion 16b. The lip portion 13 has its base end portion connected to the extended portion 16b, which extends in the same direction as the extended portion 16b, and a top end portion which is gradually curved toward an automobile interior side. The extended portion 16b and the lip portion 13 exhibit a hook-like shape in cross-sectional view of FIG. 2.

The base portion is provided with a covering portion 12e which covers a portion of automobile exterior side of the extended portion 16b (an upper side in FIG. 2), i.e., the portion which is opposite to the portion of the extended portion 16b, with which the lip portion 13 is contiguous. The covering portion 12e projects from a side of the connecting portion 12c of the front surface portion 12a of the base portion 12 toward an outer side (a right side in FIG. 2). Namely, the covering portion 12e is extended along a direction of the front surface of the glass sheet 90.

The width W3 of the covering portion 12e (a covering width) for covering the extended portion 16b and the wall thickness H (the dimension in a vertical direction of FIG. 2)

of the covering portion 12e are properly thickened in order to fix certainly the insert 15 to the base portion 12. The covering width W3 is 0.5–5 mm and the wall thickness H of the covering portion 12e is 0.5–5 mm.

An outer side surface 12f of the covering portion 12e (the end surface at a right side in FIG. 2) is substantially perpendicular to the surface of automobile exterior side of the extended portion 16b. The crossing angle of them is 90–150°.

An example of the method for preparing the frame-attached window panel 10 will be described with reference to FIG. 3.

Figure 3:
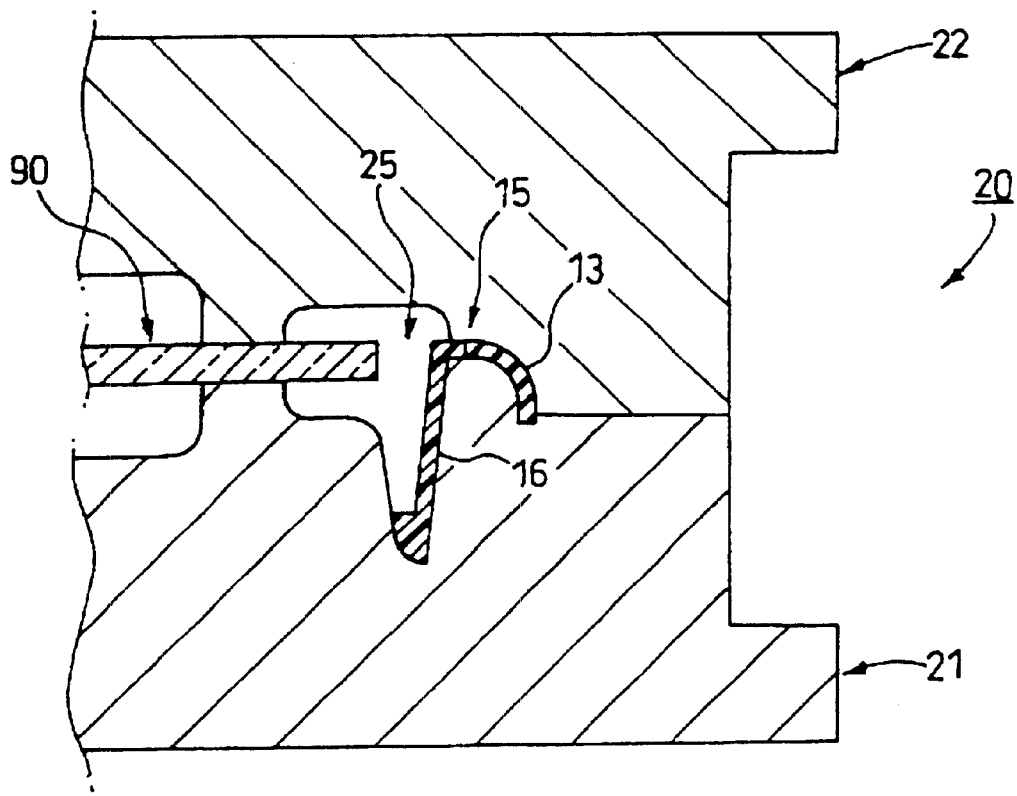
FIG. 3 is a diagrammatically cross-sectional view showing an example of the method for preparing a frame-attached window panel according to the present invention.

As shown in FIG. 3, a molding die 20 for shaping the above-mentioned frame member 11 comprises a core molding die (the first die) 21 and a cavity molding die (the second die) 22. The insert 15 and the glass sheet 90 are located at predetermined positions in the core molding die 21, and the cavity molding die 22 is moved to close the molding die.

Thus, a cavity 25 is formed at a circumferential portion of the glass sheet 90. The joining portion 16 of the insert 15 is exposed in the cavity 25. Into the cavity 25, a plasticized polyvinyl chloride material molten at a high temperature is injected. Then, the base portion 12 integrated with the glass plate 90 and the insert 15 is formed as shown in FIG. 2.

In the frame-attached window panel 10 as described above, the frame member 11 is fixed to the glass sheet 90 at the same time of shaping the base portion 12 of the frame member 11, and the insert 15 provided with the lip portion 13 made of a low frictional material is fixed to the base portion 12 without using any adhesive means. Accordingly, an operation for attaching the frame member 11 to the glass sheet 90 and an operation for bonding the lip portion 13 to the base portion 12 are unnecessary, whereby the frame-attached window panel can be prepared with high producibility at low cost. Further, the frame-attached window panel 10 has excellent appearance and durability and can effectively suppress the occurrence of noises.

Further, in the frame-attached window panel 10, since the base portion 12 and the joining portion 16 are made of the material having good compatibility, the base portion 12 and the joining portion 16 are bonded firmly, and the durability of the frame member 11 can further be improved.

The covering width W3 and the wall thickness H of the covering portion 12e of the base portion 12 are properly thickened. Further, the outer side surface 12f of the covering portion 12e is substantially perpendicular to the surface of automobile exterior side of the extended portion 16b. Accordingly, the connecting portion 12c and the extended portion 12d of the base portion 12 are firmly bonded to the joining portion 16 of the insert 15. Further, there is little possibility that a flash produces at the intersection between the outer side surface 12f of the covering portion 12e and the surface of automobile exterior side of the extended portion 16b.

Figure 4:
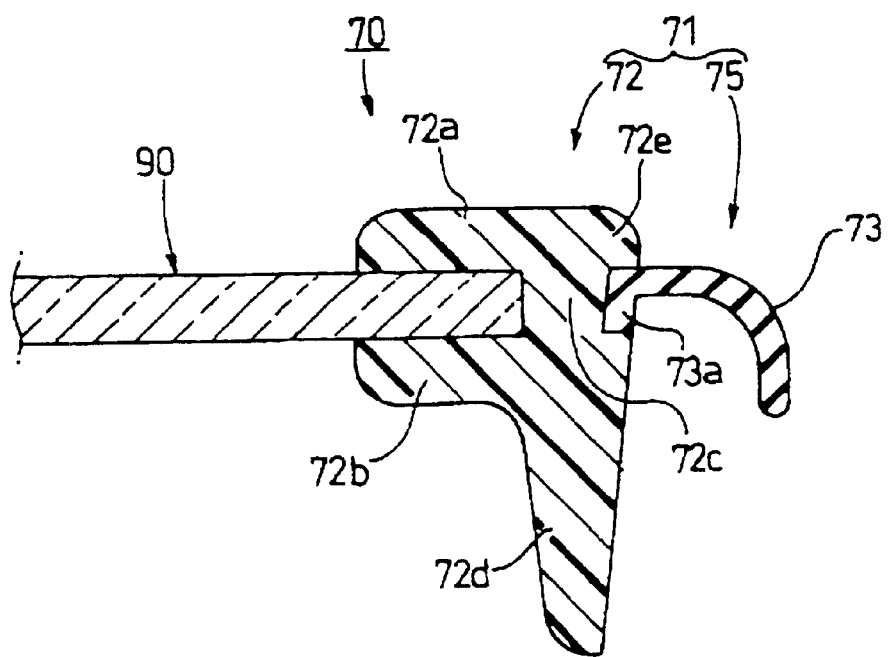
FIG. 4 is a cross-sectional view partly omitted showing a second embodiment of the frame-attached window panel according to the present invention.

FIG. 4 is a cross-sectional view partly omitted showing a frame-attached window panel according to the second embodiment of the present invention. A frame-attached window panel 70 has a frame member 71 which comprises a base portion 72 and an insert 75. The insert 75 does not have a joining portion made of the same material as the base portion 72, and comprises only a lip portion 73.

In this embodiment, an end portion of the lip portion 73 is directly connected to the base portion 72. The end portion of the lip portion 73 is a one-piece molded body of a flat-plate type lip-connecting portion 73a which is formed of the same material as the lip portion 73. As the material for the lip portion 73 and the lip-connecting portion 73a, a material exhibiting low frictional properties and high compatibility to the material for the base portion 72 is used. For example, when the base portion 72 is made of plasticized polyvinyl chloride, chlorinated polyethylene or the like may be used for the material for the lip portion 73 and the lip-connecting portion 73a. The provision of the lip-connecting portion 73a of the lip portion 73 assures a predetermined durability.

In accordance with this embodiment, the frame-attached window panel 70 having a simple structure and manufactured at low cost can be presented.

Figure 5:
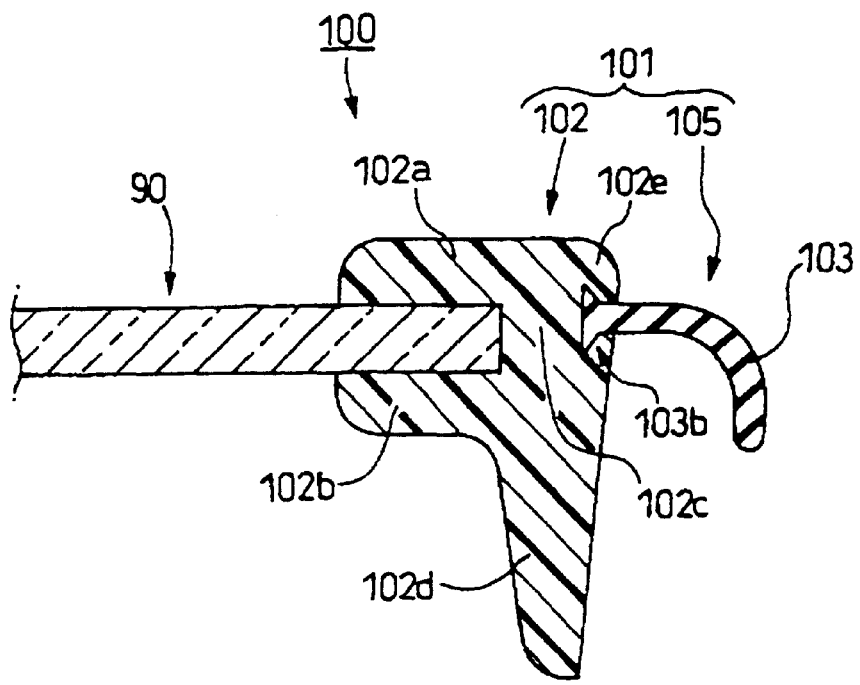
FIG. 5 is a cross-sectional view partly omitted showing a third embodiment of the frame-attached window panel according to the present invention.
Figure 6:
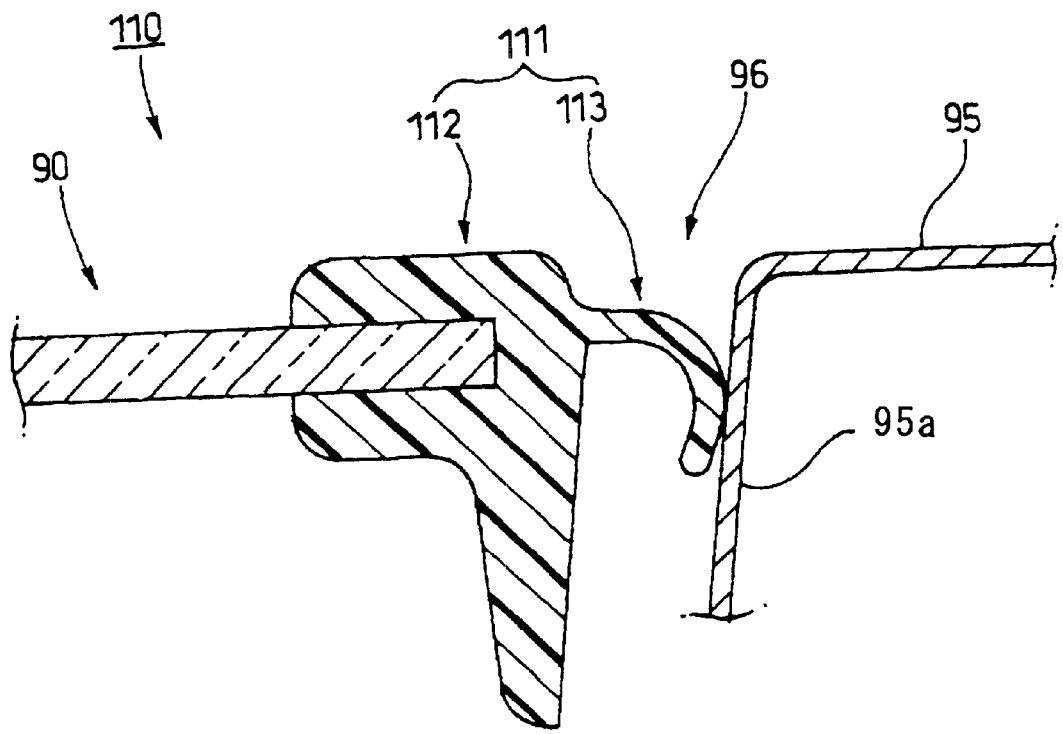
FIG. 6 is a diagram showing a first example of the conventional frame-attached window panel.
Figure 7:
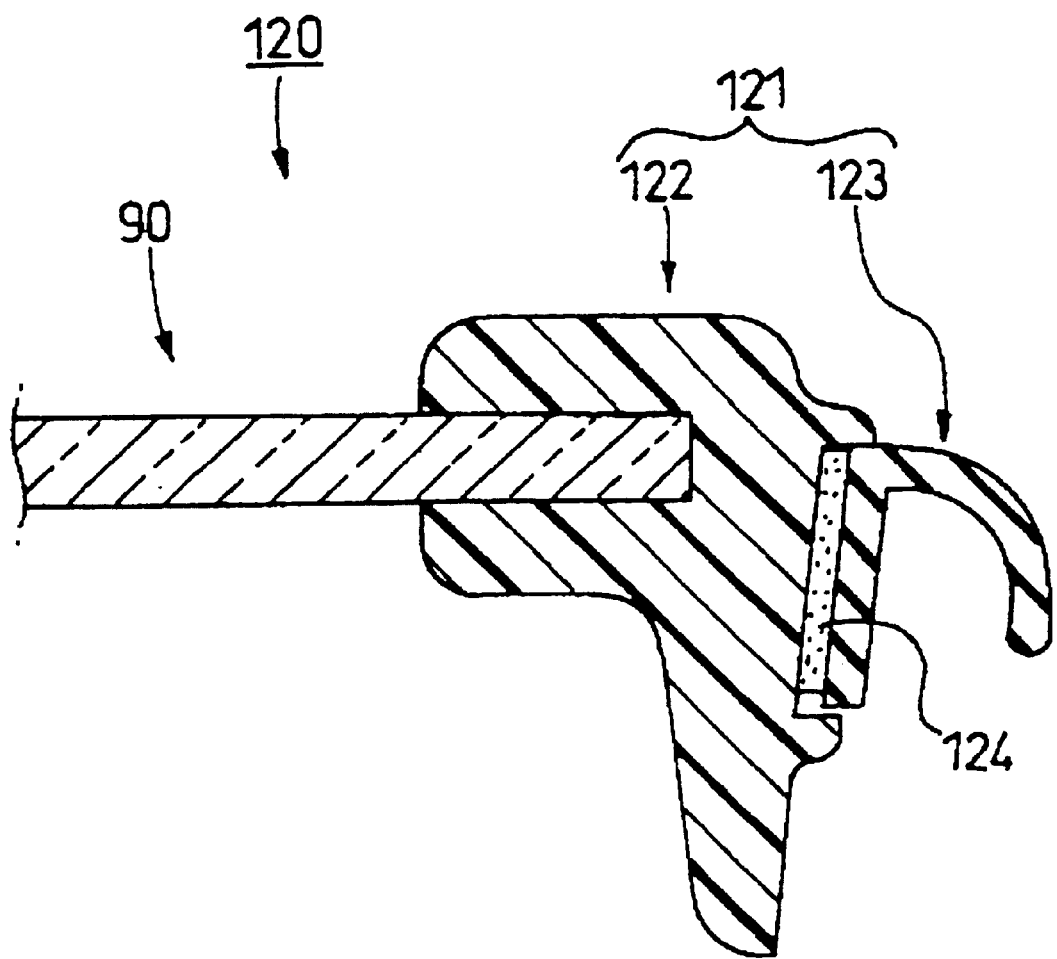
FIG. 7 is a diagram showing a second example of the conventional frame-attached window panel.

FIG. 5 is a cross-sectional view partly omitted showing a frame-attached window panel according to the third embodiment of the present invention. A frame-attached window panel 100 in FIG. 5 has a frame member 101 which comprises a base portion 102 and an insert 105. The insert 105 does not have a joining portion of the same material as the base portion 102, and comprises only a lip portion 103.

In this embodiment, an end portion of the lip portion 103 is directly connected to the base portion 102. The end portion of the lip portion 103 is a one-piece molded body of an anchor portion 103b made of the same material as the lip portion 103. In this embodiment, the anchor portion 103b has a thicker wall thickness that the lip portion 103. Specifically, the anchor portion 103b has undercuts by which the lip portion 103 is mechanically engaged with the base portion 102, with the result that the lip portion 103 is prevented from dropping from the base portion 102. In this embodiment, since the connection between the lip portion 103 and the base portion 102 can be maintained by the anchor portion 103b, a material having low compatibility with the material for the base portion 102 can be used as the material for the anchor portion 102b.

According to this embodiment, the range of choice of the material for the lip portion 103 is broadened, and the frame-attached window panel 100 can be presented at economical cost. For example, when EPDM is used as the material for the lip portion 103, an anti-freezing function can be provided for the lip portion 103.

The present invention is not limited to the above-mentioned embodiments, but it is possible to perform a suitable modification and improvement.

For example, two or more primary moldings may be provided in the base portion. Further, the primary molding is not necessarily formed by extrusion molding, but may be formed previously by injection-molding or the like.

The frame-attached window panel of the present invention is suitably used for an inlaid window for an automobile because it has an effect of suppressing noises. Further, it is in particular effective to use the frame-attached window panel to the FV window which is in particular effective for suppressing noises and has many opportunities of observation from an exterior side of automobile. When the frame-attached window panel of the present invention is applied to the FV window, it is preferable to provide the primary molding at a rear side of the frame-attached window panel which is brought to contact with a front side of the automobile door.

In accordance with the present invention as described above, the frame member is fixed to the window panel at the same time of molding the base portion of the frame member, and the primary molding is fixed to the base portion without using any adhesive means. Accordingly, a portion made of a material having a low skin friction resistance can be provided in the primary molding, whereby the frame-attached window panel having excellent appearance and durability and capable of suppressing the generation of noises can be provided at low cost.

The entire disclosure of Japanese Patent Application No. 2000-319539 filed on Oct. 19, 2000 including specification, claims, drawings and summary are incorporated herein by reference in its entirety.

What is claimed is:

1. A frame-attached window panel comprising:
a frame member integrally molded to a peripheral portion of a window panel via an injection molding process, the frame member including:
a base portion integrally molded to the peripheral portion of the window panel via the injection-molding process; and
a primary molding integrally molded to the base portion via the injection-molding process, the primary molding being made of a material different from a material for the base portion.

2. The frame-attached window panel according to claim 1, wherein the primary molding includes a joining portion and a lip portion, the joining portion being integrally molded to the base portion via the injection-molding process, the lip portion projecting from the joining portion and being made of a material different from a material for the joining portion.

3. The frame-attached window panel according to claim 2, wherein the material for the joining portion is the same as a material for the base portion.

4. The frame-attached window panel according to claim 1, wherein the primary molding and the peripheral portion of the window panel are integrally molded to the base portion during the injection-molding process which forms the base portion so that the primary molding, the peripheral portion of the window panel, and the base portion form the frame member as an one-piece unit.

5. The frame-attached window panel according to claim 2, wherein the joining portion is made of rigid polyvinyl chloride and the lip portion is made of chlorinated polyethylene.

6. A method for preparing a frame-attached window panel by molding a resinous material to form a frame member so as to be integral with a peripheral portion of a window panel and a primary molding, the method comprising the steps of:
inserting the peripheral portion of the window panel and the primary molding, which has been previously formed, into a mold cavity of a mold apparatus; and
injection-molding the resinous material into the mold cavity of the molding apparatus to form a base portion of the frame member between the peripheral portion of the window panel and the previously formed primary molding so that the base portion of the frame member is integrally molded to the primary molding and the peripheral portion of the window panel via the injection-molding.

7. The method for preparing a frame-attached window panel according to claim 6, wherein the previously formed primary molding is a pre-molded body obtained by co-extrusion of a joining portion and a lip portion, the joining portion being integrally molded to the base portion, and the lip portion projecting from the joining portion.

8. The method for preparing a frame-attached window panel according to claim 7, wherein a material for the joining portion is a same material as a material for the base portion.

9. The method for preparing a frame-attached window panel according to claim 7, wherein the joining portion is made of rigid polyvinyl chloride and the lip portion is made of chlorinated polyethylene.

* * * * *